United States Patent
Kramer et al.

(10) Patent No.: US 10,057,374 B2
(45) Date of Patent: Aug. 21, 2018

(54) PROVISIONING MULTIPLE NETWORK RESOURCES

(71) Applicant: Amazon Technologies, Inc., Seattle, WA (US)

(72) Inventors: Reto Kramer, Sammamish, WA (US); Daniel Lee Osiecki, Seattle, WA (US); Nishanth Shankaran, Kirkland, WA (US); Venkates P. Balakrishnan, Seattle, WA (US); Geoffrey Scott Pare, Seattle, WA (US); Blake Meike, Seattle, WA (US); Christopher Whitaker, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/930,482

(22) Filed: Nov. 2, 2015

(65) Prior Publication Data
US 2016/0072920 A1 Mar. 10, 2016

Related U.S. Application Data

(63) Continuation of application No. 12/824,723, filed on Jun. 28, 2010, now Pat. No. 9,178,766.

(51) Int. Cl.
*H04L 12/24* (2006.01)
*H04L 29/08* (2006.01)

(52) U.S. Cl.
CPC .......... *H04L 67/34* (2013.01); *H04L 41/0843* (2013.01); *H04L 67/1097* (2013.01)

(58) Field of Classification Search
CPC .... H04L 41/0843; H04L 67/34; H04L 1/0816
(Continued)

(56) References Cited

U.S. PATENT DOCUMENTS 6,496,840 B1 12/2002 Uceda-Sosa et al.
6,766,364 B2 7/2004 Moyer et al.
(Continued)

FOREIGN PATENT DOCUMENTS

CN 1326143 12/2001
CN 1834978 9/2006
(Continued)

OTHER PUBLICATIONS

Office Action from Chinese Application No. 201180031239.X, dated Oct. 21, 2015 (Chinese Version and English Translation not available), Amazon Technologies, Inc., pp. 1-10.
(Continued)

*Primary Examiner* — Suraj Joshi
(74) *Attorney, Agent, or Firm* — Robert C. Kowert; Meyertons, Hood, Kivlin, Kowert & Goetzel, P.C.

(57) ABSTRACT

A resource provisioning service allows users to provision multiple, different network resources in an atomic manner and with a single call to a resource provisioning service. In some instances, the multiple, different network resources comprise individual types of resources that form a portion of one or more cloud-computing platforms. For instance, one or more entities may host and operate a cloud-computing platform that includes different types of network resources, such a storage service, a load balancing service, a compute service, a security service, or any other similar or different type of network-accessible service.

20 Claims, 10 Drawing Sheets

(58) Field of Classification Search
USPC .......................................................... 709/226
See application file for complete search history.

(56) References Cited

U.S. PATENT DOCUMENTS

| | | | |
|---|---|---|---|
| 7,246,200 | B1 | 7/2007 | van Rietschote et al. |
| 7,290,164 | B1 | 10/2007 | Harvey et al. |
| 7,457,853 | B1 | 11/2008 | Chari et al. |
| 7,844,903 | B2 | 11/2010 | Dawkins et al. |
| 7,873,960 | B2 | 1/2011 | Templin et al. |
| 8,326,658 | B1 | 12/2012 | Lee et al. |
| 8,331,362 | B2 | 12/2012 | Shukla et al. |
| 8,825,817 | B1 | 9/2014 | Jaisinghani et al. |
| 2002/0087734 | A1* | 7/2002 | Marshall ................. G06F 9/50 719/310 |
| 2004/0054690 | A1* | 3/2004 | Hillerbrand ............ G06Q 10/06 |
| 2005/0021688 | A1 | 1/2005 | Felts et al. |
| 2006/0050862 | A1 | 3/2006 | Shen et al. |
| 2006/0075102 | A1* | 4/2006 | Cupit ..................... G06Q 10/06 709/225 |
| 2006/0195575 | A1 | 8/2006 | Delany et al. |
| 2006/0206899 | A1 | 9/2006 | Suzuki et al. |
| 2007/0016897 | A1 | 1/2007 | Todd |
| 2007/0112574 | A1 | 5/2007 | Greene |
| 2007/0260712 | A1 | 11/2007 | Jibbe |
| 2008/0163171 | A1 | 7/2008 | Chess et al. |
| 2008/0288239 | A1 | 11/2008 | Bailey et al. |
| 2009/0064135 | A1 | 3/2009 | Jimmerson |
| 2009/0077090 | A1 | 3/2009 | Pacifici et al. |
| 2009/0217287 | A1 | 8/2009 | Blum et al. |
| 2010/0005529 | A1 | 1/2010 | Hemade |
| 2010/0023934 | A1 | 1/2010 | Sheehan et al. |
| 2010/0037287 | A1 | 2/2010 | Netrakanti et al. |
| 2010/0050173 | A1* | 2/2010 | Hensbergen .......... G06F 9/5072 718/1 |
| 2010/0131324 | A1* | 5/2010 | Ferris ................. G06Q 10/0631 705/7.12 |
| 2010/0131624 | A1 | 5/2010 | Ferris |
| 2010/0131625 | A1 | 5/2010 | Dehaan et al. |
| 2010/0154024 | A1 | 6/2010 | Boxmeyer et al. |
| 2010/0165876 | A1 | 7/2010 | Shukla et al. |
| 2010/0318658 | A1* | 12/2010 | Zorn ..................... G06F 9/5066 709/226 |
| 2011/0296018 | A1* | 12/2011 | Deng ................. G06F 17/30734 709/226 |
| 2011/0320574 | A1 | 12/2011 | Felts |
| 2011/0320605 | A1 | 12/2011 | Kramer et al. |
| 2012/0147894 | A1 | 6/2012 | Mulligan et al. |
| 2012/0179808 | A1 | 7/2012 | Bergkvist et al. |
| 2012/0246630 | A1 | 9/2012 | Kuzins et al. |
| 2013/0097651 | A1 | 4/2013 | Rendahl et al. |
| 2013/0124807 | A1 | 5/2013 | Nielsen et al. |
| 2013/0167211 | A1 | 6/2013 | Kamat |
| 2013/0212183 | A1 | 8/2013 | Ward |
| 2013/0232480 | A1 | 9/2013 | Winterfeldt et al. |
| 2013/0232498 | A1 | 9/2013 | Mangtani et al. |
| 2013/0283273 | A1 | 10/2013 | Miyazaki |

FOREIGN PATENT DOCUMENTS

| | | |
|---|---|---|
| CN | 101156138 | 4/2008 |
| CN | 101166173 | 4/2008 |
| JP | 2004086769 | 3/2004 |
| JP | 2005056201 | 3/2005 |
| JP | 2005266917 | 9/2005 |
| JP | 2007-520814 | 7/2007 |
| JP | 2007193696 | 8/2007 |
| JP | 2009217321 | 9/2009 |
| JP | 2010140403 | 6/2010 |
| JP | 2012501021 | 1/2012 |
| WO | WO2010023139 | 3/2010 |

OTHER PUBLICATIONS

U.S. Appl. No. 12/824,723, filed Jun. 28, 2010, Reto Kramer, et al.
Office Action from Japanese Application No. 2013-518539, dated Jun. 2, 2015 (English Translation and Japanese Version), pp. 1-6.
Office Action from Chinese Application No. 201180031239.X, dated Apr. 22, 2015 (English Translation and Chinese Version), pp. 1-20.
U.S. Appl. No. 13/424,143, filed Mar. 19, 2012, Avinash Jaisinghani.
Anil Jain, et al., "Biometric template security", Jan. 2008, ACM, vol. 2008, pp. 1-17.
Sascha Konrad, et al., Using Security Patterns to Model and Analyze Security Requirements, 2003, Michigan State University, pp. 1-10.
Ankur Taly, et al., Automated Analysis of Security-Critical JavaScript APIs, May 22-25, 2011, IEEE, pp. 363-378.
Komathy K., et al., "Component-based Security Model for XML Messaging Services", Nov. 6-8, 2002, IEEE, pp. 132-133.
U.S. Appl. No. 14/473,037, filed Aug. 29, 2014, Avinash Jaisinghani.
AWS, "Cloudformation User Guide", APO Version, May 15, 2010, pp. 1-463 (2013).
U.S. Appl. No. 13/424,160, filed Mar. 19, 2012, Reto Kramer.
U.S. Appl. No. 13/424,089, filed Mar. 19, 2012, Avinash Jaisinghani.
Office Action from Japanese Application No. 2013-518539, dated Jan. 21, 2014 (English Translation and Japanese Version); pp. 1-14.
The Extended European Search Report for Application No. 11804097.1, dated Mar. 27, 2014, pp. 1-6.
The PCT Search Report dated Nov. 3, 2011 for PCT Application No. PCT/US11/42050, pp. 1-9.
"Cloud Computing. Delivered", RightScale Inc., Retrieved on May 7, 2010 at URL: http://www.rightscale.com, pp. 1-7.
"Open Virtualization Format", VMware Inc., Retrieved on May 7, 2010, URL: http://www.vmware.com/appliances/getting-started/learn/ovf.html, pp. 1-6.
Office Action from Chinese Application No. 201180031239X, dated Jun. 28, 2017 (Chinese version and English translation), Amazon Technologies, Inc., pp. 1-28.

* cited by examiner

EXAMPLE STACK ADOPTION
800

EXAMPLE EXTERNAL
STACK STATE TRANSITION
1000

PROVISIONING MULTIPLE NETWORK RESOURCES

This application is a continuation of U.S. patent application Ser. No. 12/824,723, filed Jun. 28, 2010, now U.S. Pat. No. 9,178,766, which is hereby incorporated by reference in its entirety.

BACKGROUND

Large-scale, network-based computing represents a paradigm shift from traditional client-server computing relationships. With large-scale, network-based computing platforms (e.g., data centers), customers are able leverage shared resources on-demand by renting resources that are owned by third parties and that reside "in the cloud." With these resources, customers of the platform are able to launch and maintain large applications without actually owning or servicing the underlying infrastructure necessary for these applications. As such, network-based computing platforms have expanded the class of individuals and companies able to effectively compete in the realm of computing applications. Despite these advances, these individuals and companies may still experience difficulty in working with hosts of these network-based computing platforms for the purpose of provisioning the desired resources.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
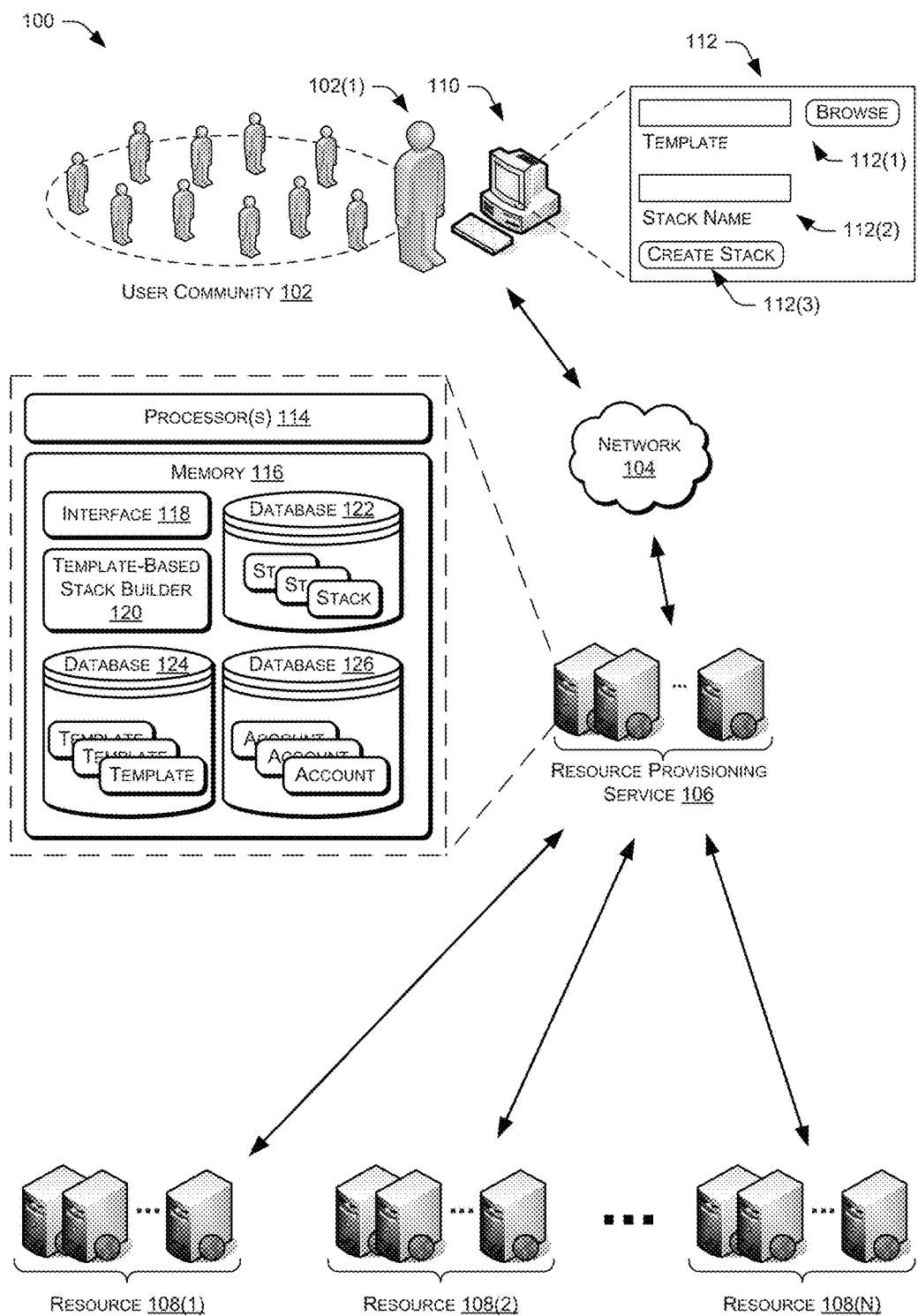
FIG. 1 illustrates an example environment in which users of a user community may interact with a resource provisioning service for the purpose of provisioning multiple, different network resources. Within this environment, the users may provision the multiple resources with a single request to the provisioning service in some implementations.

This disclosure describes an architecture and techniques for allowing users to provision multiple, different network resources in an atomic manner and with a single call to a resource provisioning service. In some instances, the multiple, different network resources comprise individual types of resources that form a portion of one or more cloud-computing platforms. For instance, one or more entities may host and operate a cloud-computing platform that includes different types of network resources, such a storage service, a load balancing service, a compute service, a security service, or any other similar or different type of network-accessible service.

In one example, a user may desire to launch an application (e.g., a web application) with use of multiple network resources offered by one or more third-party entities. The user may desire a load-balancing service to route workload amongst multiple, different resources, a compute service to host the application and to provide computing capability, an online storage service to store client data, and a security service to provide security to users of the application. While a single entity may offer and operate each of these network resources, multiple, different entities may offer and operate one or more of these resources in other implementations.

In either event, a resource provisioning service may communicate with the user to provision these multiple, different network resources. For instance, the user may make an initial request to the provisioning service to provision a stack of multiple network resources. In some instances, the request may be based on a template that includes pre-populated instructions for provisioning the multiple resources. This template provides the user with a declarative language to author a stack-creation request, allowing the user to focus on which resources to provision and the interconnection of these resources, rather than on how to build these stacks and which application programming interface (API) calls to invoke. For instance, the template may instruct (e.g., in extensible markup language (XML) format, JavaScript Object Notation (JSON), etc.) the provisioning service to provision one or more different network resources.

In some instances, the user may then alter the instructions in the template to specify particular parameters associated with the resources and may save this template with the changes as a new template. For instance, the user may specify a particular desired size of a storage service, a number of desired computers of the compute service, and the like to create a new template. Furthermore, the user may assign a logical name to one or more of the network resources or components of the network resources when creating the new template. The user may also alter the original template in any other way by, for example, deleting portions of the instructions or adding new instructions to provision even more network resources than the template previously called out to create the new template. In another example, the user may also make a call, within the template, to another template. As such, templates may become building blocks for use in creating stacks of multiple, different network resources.

When the user is satisfied with the resulting instructions (with or without alterations to the template), the user provides instructions back to the provisioning service to store the instructions as a new template. For instance, the user may provide a text file comprising the new template. This template may comprise instructions in XML or JSON format, or in any other suitable format.

After the provisioning service stores the new template, the user may then request to create a stack of resources with use of that template (or with use of another template). In response, the provisioning service may retrieve and parse the template to identify the stack of desired network resources. In one example, for instance, the provisioning service may identify that the user would like to employ a load balancing service of a particular size, a particular number of servers of a compute service, a storage service of a particular size, and a particular type of security service. In response, the provisioning service may attempt to provision each of the requested network resources on behalf of the user. That is, the provisioning service may attempt to secure the desired services of the load balancing service, the compute service, and the like.

Furthermore, the provisioning service may attempt to provision at least a portion of the network resources in parallel with one another. For instance, the provisioning service may determine dependencies amongst the multiple network resources, and may attempt to provision the resources according to these dependencies. The provisioning service may identify implicit dependencies from the text file, or the provisioning service may receive explicit dependencies specified by the user.

In some instances, the provisioning service attempts to provision atomically the stack of the network resources. That is, the provisioning service will consider a stack successfully created when the provisioning service is able to successfully provision each of the requested network resources. In response to successfully provisioning the stack, the provisioning service may notify the user of this success. In instances where the provisioning service fails to provision one or more of the requested resources (e.g., after repeated tries), the provisioning service may deem the provisioning of the stack a failure and may roll back or tear down those requested resources that the provisioning service has successfully provisioned. In addition, the provisioning service may notify the user of this failure. As such, the user knows that at the time of submitting the request to provision the stack of multiple network resources that either all of the requested resources will be provisioned, or none of them will.

The discussion begins with a section entitled "Example Architecture" that describes an example architecture that may implement the techniques introduced above. Next, a section entitled "Example Processes" follows, and describes example processes for provisioning multiple network resources using the described example architecture of FIG. 1. A section entitled "Example Resource Provisioning Service and Processes" follows, describing specific examples of the resource provisioning service described in FIG. 1 and processes that the example service may implement for creating, deleting, and adopting stacks. This section also describes example transitions of internal and external stack state during these processes. Finally, the discussion ends with a brief conclusion.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Example Architecture

FIG. 1 illustrates an example architecture 100 that may implement the described techniques. The architecture 100 includes a user community 102 that communicates over a network 104 with a resource provisioning service 106 for provisioning multiple network resources 108(1), 108(2), . . . , 108(N) (or simply, "resources"). For instance, users of the user community 102 may provision services of one or more cloud-computing platforms, potentially hosted in one or more large-scale data centers. As discussed above, these network resources may include a storage service, a load balancing service, a compute service, a security service, a domain name system (DNS) service, or any other similar or different type of network-accessible service. These resources 108(1)-(N) may each be associated with a common entity or owner, with separate entities or owners, or a combination thereof.

The network 104, meanwhile, is representative of any one or combination of multiple different types of networks, such as the Internet, cable networks, cellular networks, wireless networks, and wired networks. The network 104 may be a public or a private network. Furthermore, while FIG. 1 illustrates several arrows, each of the illustrated services may communicate directly or indirectly with one another via the network 104 or via a different network.

In the illustrated example, a representative user 102(1) uses a computing device 110 to access the resource provisioning service 106 to request the provisioning of one or more of the network resources 108(1)-(N). For instance, the user 102(1) may desire to launch a web application using cloud-based resources. As such, the user 102(1) may send a request to provision multiple resources, such as load balancers from a load balancing servers, databases from a storage service, and the like.

In response to accessing the resource provisioning service 106 and making such a request, the resource provisioning service 106 may serve a user interface (UI) 112 to the computing device 110 of the user 102(1). FIG. 1 illustrates one example of such a UI. As illustrated, the UI 112 includes a first area 112(1) that allows the user to select a template to use for making a request to provision a stack of a specific set of the resources 108(1)-(N). The UI 112 also includes a second area 112(1) that allows the user 102(1) to create a name for the stack that is to be created. Finally, the example UI 112 includes an icon 112(3) that, when selected, sends the request to the resource provisioning service 106. In response to receiving this request, the resource provisioning service 106 may attempt to create the stack of resources specified in the template, as described in detail below. While FIG. 1 illustrates one example UI, other implementations may employ any other similar or different UI.

As illustrated, each of the resources 108(1)-(N) and the resource provisioning service 106 is embodied as one or more servers that collectively have processing and storage capabilities to receive and send requests. These servers may be embodied in any number of ways, including as a single server, a cluster of servers, a server farm or data center, and so forth, although other server architectures (e.g., mainframe) may also be used.

The resource provisioning service 106 comprises one or more processors 114 and memory 116, which stores an interface 118 and a template-based stack builder 120. The service 106 also stores or has access to databases 122, 124, and 126. The interface 118 comprises a network-accessible interface that allows users of the user community to access and communicate with the resource provisioning service 106. For instance, users of the user community 102 may make calls into the interface via certain public APIs. In these and other instances, users of the user community 102 access the interface 118 for the purpose of requesting to provision one or more of the network resources 108(1)-(N).

The template-based stack builder 120, meanwhile, functions to receive requests from users to create a stack of network resources (as described above) and to provide an appropriate template to the users based on the requests. For instance, in the illustrated example the builder 120 may receive a request to provision a named stack of resources with use of a particular template selected by the user 102(1). In response, the builder 120 may locate the selected template from the database 124, which may store or otherwise have access to previously created templates. The resource provisioning service 106, users of the user community 102, and/or other entities may have previously created some or all of the templates within the database 124 in some instances.

After locating the selected template, the builder 120 provides this template to the computing device 110 of the user 102(1). This template may comprise pre-populated instructions for provisioning a particular set of the network resources 108(1)-(N). The user 102(1) may then use the template in whole or in part to form the actual request for resources. For instance, the user may alter certain parameters of the pre-populated instructions to specify a size of a requested resource, a number of components (e.g., computers, databases, etc.) of a requested resource, a particular version of a resource, or any other parameter. In some instances, the user 102(1) may specify logical names within the template for one or more components of the resource. These logical names comprise names chosen by the user for the convenience of the user when later managing these resources by making status or request calls to the resource provisioning service 106.

Additionally or alternatively, the user 102(1) may add instructions to the template to call yet another resource(s) or may remove instructions effective to remove a resource(s) from being provisioned. After modifying (or refraining from modifying) the template provided by the service 106, the user 102(1) submits the altered template for storage by the resource provisioning service 106 as a new template. The user 102(1) may then send a request to provision the resources as specified by the new template. In some instances, the template may form a text file that includes instructions in extensible markup language (XML) format, JavaScript Object Notation (JSON) format, or the like.

Upon receiving a request to provision resources based on a template, the builder 120 may retrieve and parse the template (e.g., which may be in the form of a text file) to determine the identity and parameters (e.g., size, etc.) of the desired resources, as well as the order in which to provision these resources. The builder 120 may determine the order based on implicit dependencies gleaned from the actual instructions of the text file, and/or based on explicit dependencies provided by the user 102(1).

After parsing the file, the builder 120 may then attempt to provision each of the requested resources on behalf of the user, potentially in an atomic manner. In these instances, the resource provisioning service 106 attempts to provision each of the requested ones of the network resources 108(1)-(N) prior to notifying the user. If the resource provisioning service 106 successfully provisions each of the requested resources, then the resource provisioning service 106 notifies the user 102(1) that the service 106 has successfully created the requested stack. The service 106 may also update the database 122 to reflect the newly-provisioned stack. Finally, the service 106 may charge costs associated with these provisioned resources to an account of the user 102(1), maintained by the database 126.

In instances where the builder 120 of the resource provisioning service 106 is unable to successfully provision each requested resource (e.g., after multiple retries), the service 106 may notify the user 102(1) that stack creation has failed. In addition, the service 106 may roll back or tear down those ones of the requested network resources that the service 106 has successfully provisioned. The service 106 may or may not charge a user account for these successfully provisioned resources.

By operating in this atomic manner, the resource provisioning service 106 provides comfort to the user 102(1), who knows that the service 106 will either fully succeed in provisioning the requested stack of resources or will return to the state of the system prior to receiving the user's request. That is, even in the latter instances the user 102(1) will not be left with a half-completed and non-functioning stack, as the service 106 will roll back each provisioned network resource. In addition to providing this comfort, the architecture 100 and the associated techniques allow the user to make a single request to the resource provisioning service 106 rather than multiple requests corresponding to each requested resource. The service 106 further eases this single call by providing a template to the user 102(1) on which to base the request.

Example Processes

Figure 2:
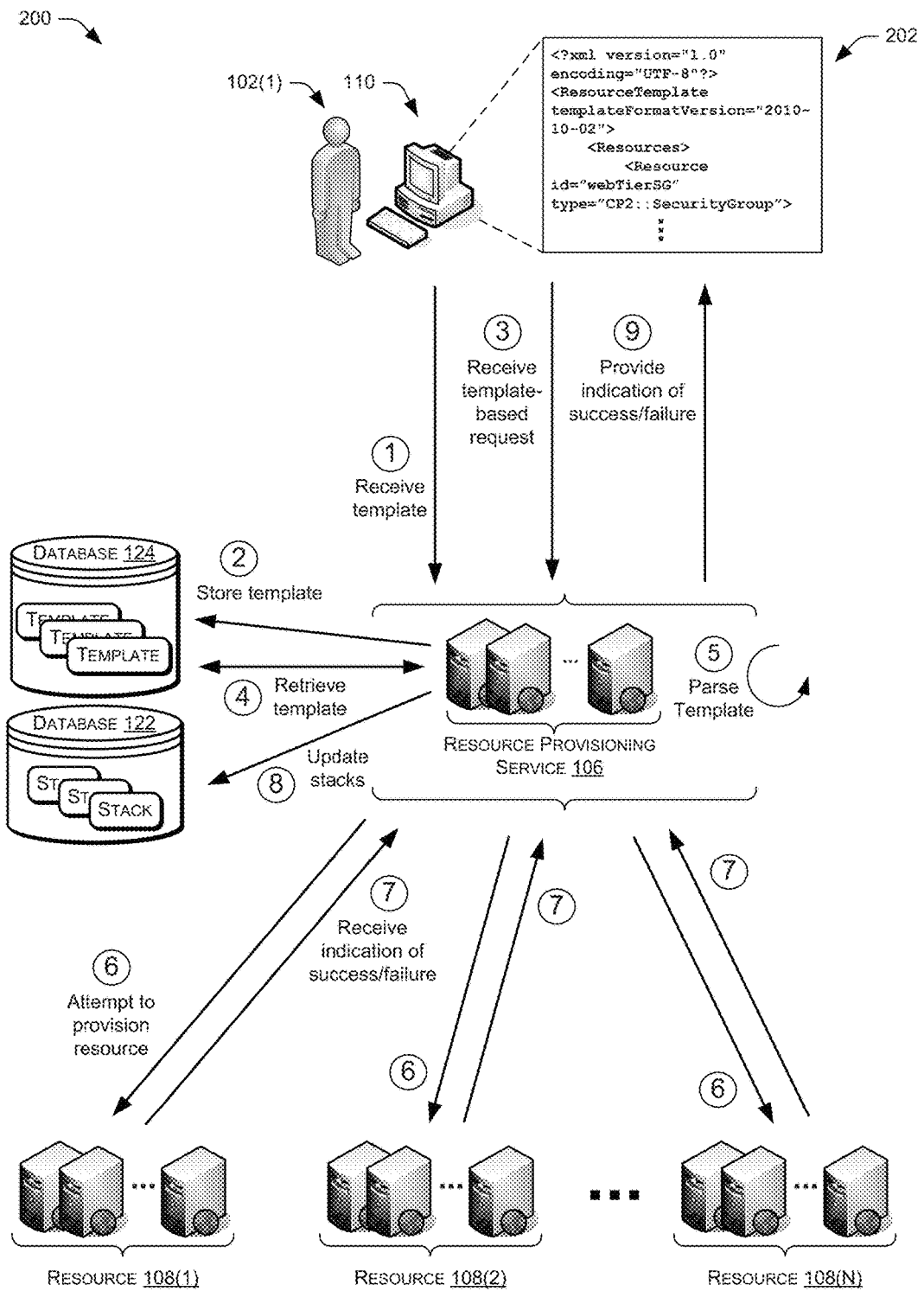
FIG. 2 illustrates an example process that the architecture of FIG. 1 may implement for the purpose of provisioning multiple, different network resources.

FIG. 2 is an example process 200 that the architecture 100 of FIG. 1 may implement. This process (as well as other processes described throughout) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

For discussion purposes, the process 200 (and the other processes) is described with reference to the architecture 100 of FIG. 1, although other architectures may implement this process.

In this example, at "1," the resource provisioning service 106 receives, from the computing device 110 of the user 102(1), a new template from a user that is effective to attempt to provision a stack of multiple, different network resources on behalf of the user. For instance, the user 102(1) may have submitted this template via a UI served by the resource provisioning service 106. Further, this template may have been based on a template previously stored by the service. That is, the user 102(1) may have requested and received a template via the UI 112 of FIG. 1, modified this template to form a new template, and then sent the new template for storage by the service 106. In some instances, the user 102(1) may request storage of the template via a "Register Template" call to the resource provisioning service 106. At "2," the resource provisioning service 106 stores the received template in the database 124.

At "3," the resource provisioning service 106 receives a request from the user 102(1) to provision a stack of resources on behalf of the user. In this example, the user 102(1) requests that the service 106 provision the resources in the manner specified by the template stored at "2." That is, at "3," the user 102(1) may call the template previously created by the user 102(1) stored by the service 106. Of course, in other instances, the user 102(1) may call a template created by another user of the user community 102, by the resource provisioning service 106, and/or by any other entity.

FIG. 2 illustrates an example of a template 202, which comprises instructions in XML format for provisioning a set of the network resources 108(1)-(N). While the example template 202 illustrates one example format of these instructions, the provided template may comprise other text-based instructions, selectable icons, radio buttons, or any other interface (graphical or otherwise) with which the user may request to provision multiple ones of the network resources 108(1)-(N).

At "4," in this example the resource provisioning service 106 retrieves the template on which the user 102(1) based his or her request. In this example, the user 102(1) specifies the recently stored template created by the user and, hence, the service 106 retrieves this template from the database 124. As discussed above, the user 102(1) may have customized this template. For instance, the user 102(1) may have specified values of certain parameters, such as particular versions of the resources, sizes of the resources, logical names of the resources, and the like.

At "5," the resource provisioning service 106 parses the template to identify the requested ones of the network resources 108(1)-(N) and to identify an order in which to attempt to provision these requested resources. The service 106 may base this order in whole or in part upon implicit and/or explicit dependencies. The service 106 may identify the implicit dependencies by analyzing characteristics of the resources that the user 102(1) requests. The service 106 may identify explicit dependencies in response to receiving these dependencies explicitly from the user 102(1). For instance, the user 102(1) may state a desired order in which to attempt to provision the resources, in whole or in part.

At "6," the resource provisioning service 106 attempts to provision the requested network resources, potentially in the determined order. In this example, the user 102(1) has requested to provision the network resources 108(1), 108(2), and 108(N). In some instances, the resource provisioning service 106 attempts to provision at least some of these requested resources in parallel.

At "7," the resource provisioning service 106 receives an indication from each of the resources indicating whether or not the service 106 successfully provisioned the respective resource (after one or more multiple tries). In this example, each of the resources provides an indication of success and, as such, the resource provisioning service 106 considers the creation of the stack a success. As such, the resource provisioning service 106 updates the database 122 to reflect the new stack at "8." The resource provisioning service 106 may also update the database 126 to associate this stack with the account of the user 102(1) and to charge the account of the user 102(1) for the created resources.

Finally, at "9," the resource provisioning service 106 provides an indication of success or failure to the user 102(1). For instance, the resource provisioning service 106 may provide this indication to the computing device 110 or may communicate this indication via another communication channel. In this example, the resource provisioning service 106 provides an indication that the service 106 has successfully provisioned each of the requested network resources 108(1), 108(2), and 108(N) on behalf of the user 102(1). In some instances, the user 102(1) may send a query regarding the status of the requested stack creation prior to receiving the indication at "9." The service 106 may in turn respond to this request, informing the user 102(1) as to whether or not the stack has yet to be successfully created.

Figure 3:
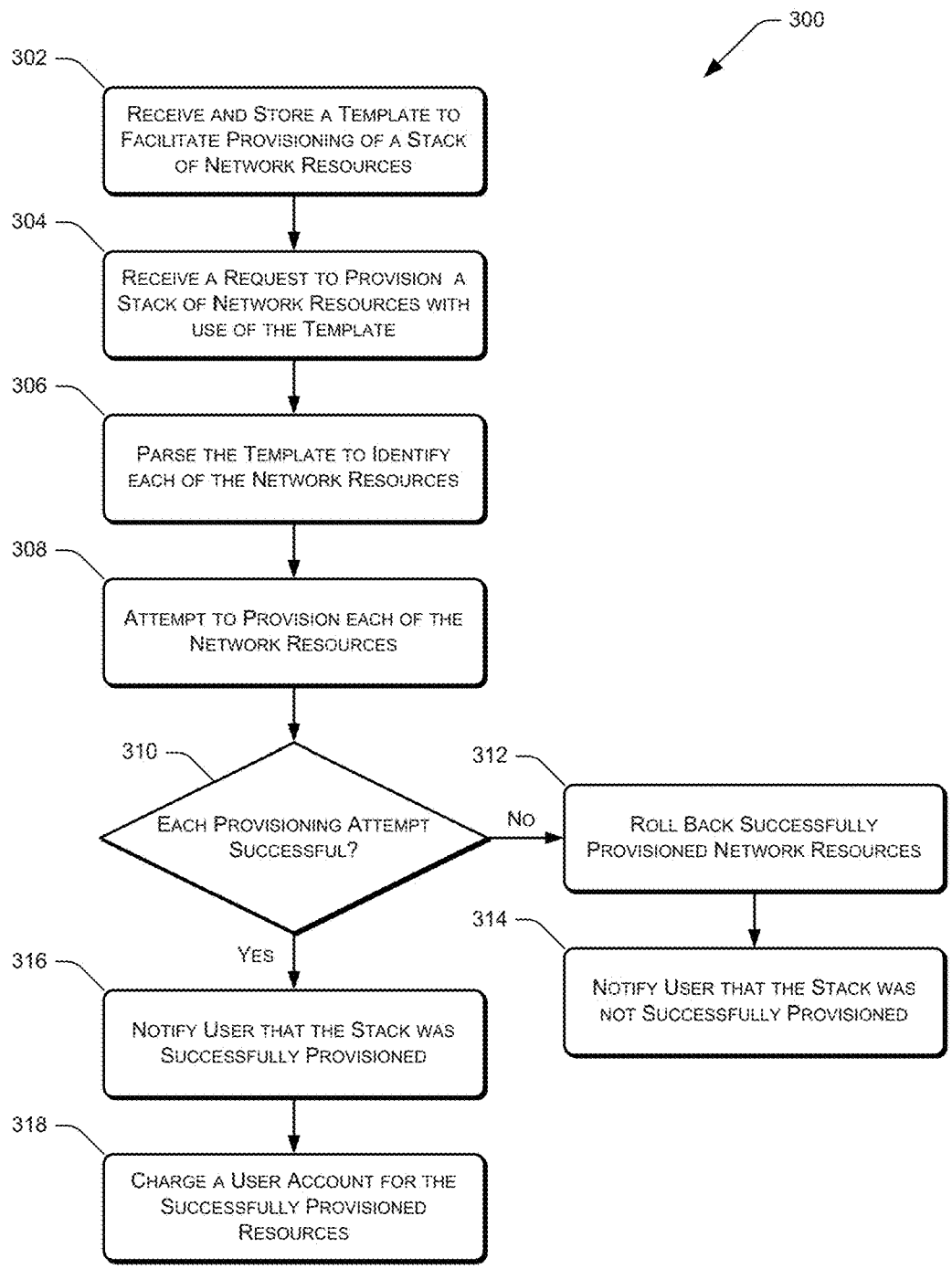
FIG. 3 is a flow diagram of an example process that the resource provisioning service may implement for provisioning multiple different network resources. Here, the process may comprise an atomic process in that the service either successfully provisions each requested resource or none of the requested resources.

FIG. 3 is a flow diagram of an example process 300 that the resource provisioning service 106 may implement for provisioning multiple different network resources. Here, the process 300 may comprise an atomic process in that the service either successfully provisions each requested resource or none of the requested resources.

The process 300 includes, at 302, the resource provisioning service 106 receiving a template from a client computing device and, in response, the service storing the received template. This template may facilitate provisioning of a stack of network resources. At 304, the resource provisioning service 106 receives a request to provision a stack of network resources with use of the template. In some instances, the template and the request may be received simultaneously (e.g., the template may comprises the request), although they need not. At 306, the resource provisioning service 106 parses the template to identify the resources and, at 308, the resource provisioning service 106 attempts to provision each of the identified resources.

At 310, the resource provisioning service 106 determines whether each provisioning attempt has proven successful. If not, then the resource provisioning service 106 rolls back each successfully provisioned network resources at 312. In some instances, the service ceases attempting to provision resources as soon as a single resource call fails. In either instance, the resource provisioning service 106 also proceeds to notify the requesting user of the failure at 314. In some instances, the resource provisioning service 106 may also charge a user account of the requesting user for the successfully provisioned resources (e.g., as soon as the service 106 successfully provisions these resources and without regard as to whether or not the creation of the entire stack succeeds).

If, however, the resource provisioning service 106 determines that each provisioning attempt has proven successful, then the resource provisioning service 106 notifies the requesting user of this success at 316. At 318, the resource provisioning service 106 may charge a user account of the requesting user for the successfully provisioned resources.

Example Resource Provisioning Service and Processes

Figure 4:
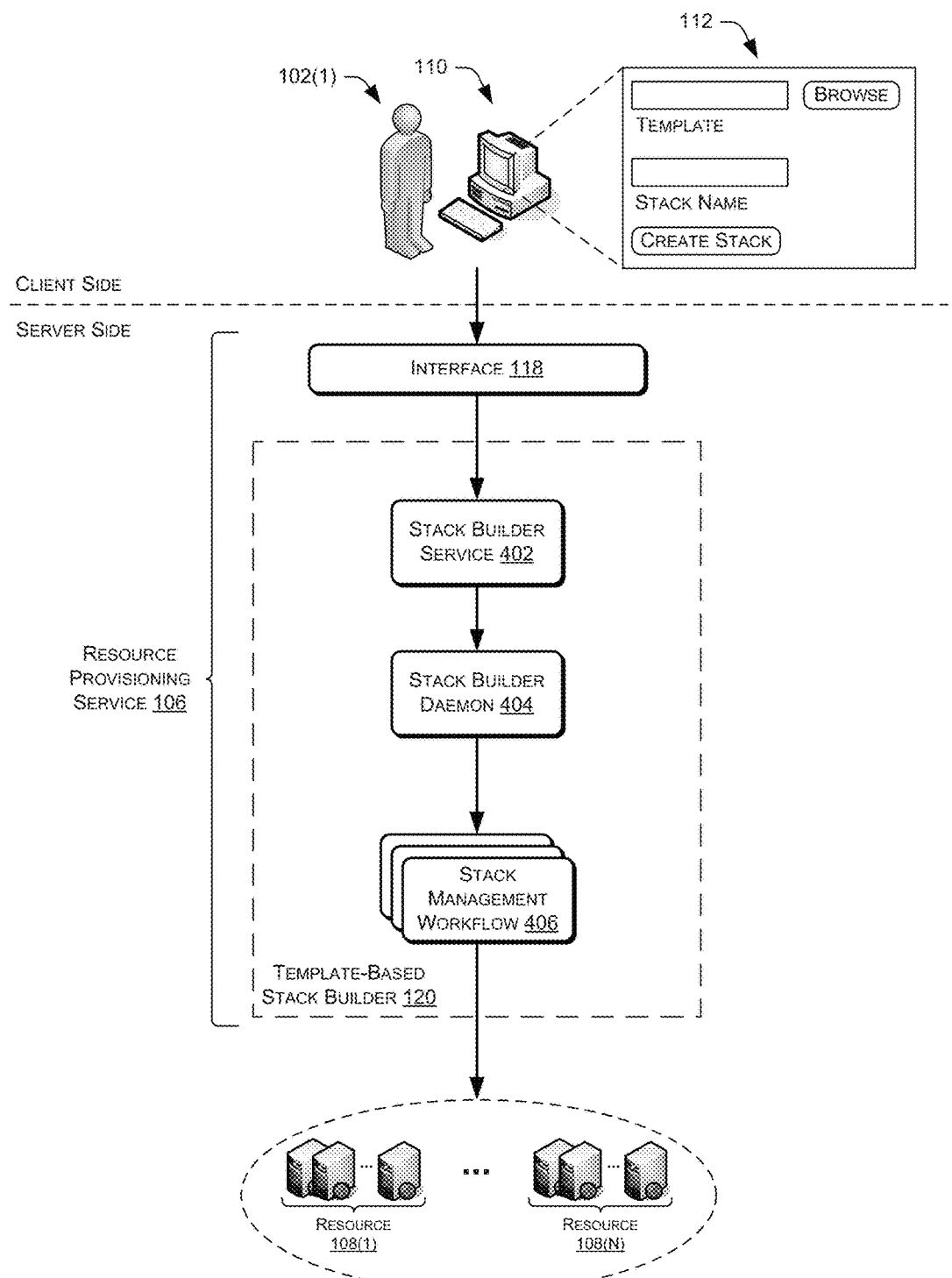
FIG. 4 illustrates one example of a template-based stack builder of the resource provisioning service of FIG. 1 in greater detail.

FIG. 4 illustrates one example of the resource provisioning service 106 of FIG. 1 in great detail. As illustrated, the resource provisioning service 106 includes the interface 118 and the template-based stack builder 120, as discussed above. In one example, the template-based stack builder 120 may include a stack builder service 402, a stack builder daemon 404, and one or more stack management workflows 406.

As discussed above, the interface 118 is a network-facing component that allows users of the user community 102 to call through public APIs. One function of this layer is to accept, validate, authenticate, authorize, and route requests to the network resources 108(1)-(N). Other functions include throttling, request logging, and delegation token exchange. The interface 118 may proxy one or more of the following APIs for the network resources 108(1)-(N): Register Template, Describe Templates, Delete Template, Create Stack, Describe Stack, Delete Stack, Describe Stack Resources, Describe Stack Events, and Adopt Stack.

The stack builder service 402, meanwhile, provides concrete implementations of various APIs fronted by the interface 118. This service 402 may also provide one or more internal APIs. APIs provided by this service can be classified as template management APIs, stack management APIs, and audit trail APIs in some instances.

Template management APIs are responsible for the storage and processing of the templates (e.g., in the database 124 of FIG. 1). Raw, user-provided templates are accepted and validated before being transformed into a canonical/reduced form for storage alongside the raw original. The stack builder service 402 provides the ability to look up these uploaded templates by name, and to mark them as deprecated. Example template management APIs may include Register Template, Describe Template, and/or Delete Template.

Stack management APIs, meanwhile, are the entry point for initiating stack creation and deletion and obtaining stack description. The stack creation and deletion calls may be handled in an asynchronous manner. That is, the stack builder service 402 validates and records user requests for stack creations and deletions, while the stack builder daemon 404 asynchronously handles the actual processing of the users' intent. Stack management APIs also enable the reading and writing of stack resource data into underlying storage. Users of the user community 102 can request to inspect the logical-physical bindings for their stack's resource via these APIs. Similarly, when the stack management workflows 406 allocate or de-allocate a stack's resources, the stack management workflows 406 use the stack management APIs to record/update the physical-logical mappings. The stack management APIs may include Create Stack, Describe Stack, Delete Stack, Adopt Stack, Describe Stack Resources, Add Stack Resource (Internal APIs), and/or Delete Stack Resource (Internal APIs).

The stack builder service 402 may also maintain audit trail APIs, which enable logging of resource creation/deletion actions performed on behalf of a user. In some instances, each action is logged for the purpose of maintaining a log of costs charged to the each user account in the database 126. In addition, each user of the user community 102 having an account within the database 126 may retrieve the user's log by invoking the Describe Stack Events API. The audit trail APIs may include Describe Stack Event and/or Add Stack Event.

The stack builder daemon 404, meanwhile, is responsible for integrating the stack management workflows 406 with the job state storage described above. This daemon 404 may periodically check the stack request table for new/un-started requests and may spawn stack management workflows 406 to handle these requests. The stack builder daemon 404 may also periodically check up on existing stack management workflows 406 and may mark some of these workflows as complete in the job storage records. This may effectively decouple stack management workflows 406 calls from any front-end services.

Finally, the stack management workflows 406 are responsible for executing various steps for the creation and configuration of network resources 108(1)-(N) during stack creation, as well as during graceful shutdown and termination of network resources 108(1)-(N) during stack deletion.

Figure 5:
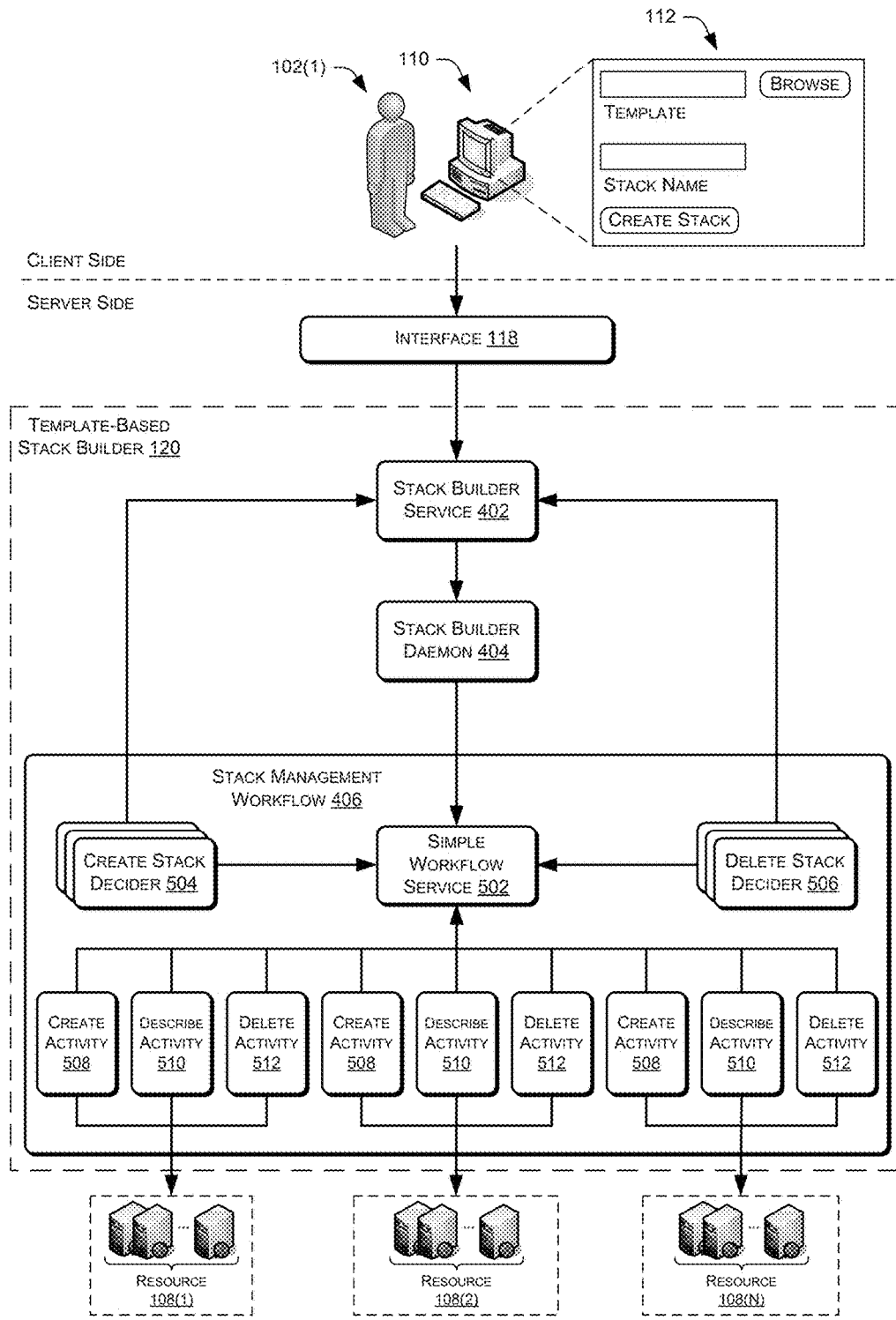
FIG. 5 illustrates an example stack management workflow of the resource provisioning service of FIG. 1.

FIG. 5 illustrates an example stack management workflow 406 of the resource provisioning service 106 of FIGS. 1 and 4. As illustrated, the example stack management workflow 406 is built atop a Simple Workflow Service (SWF) 502. The stack management workflow 406 comprises two workflow types: a Create Stack Workflow Type and A Delete Stack Workflow Type. The Create Stack Workflow Type is associated with a create stack decider 504, while the Delete Stack Workflow Type is associated with a delete stack decider 506. In addition, these workflows are associated with corresponding create activities 508, describe activities 510, and delete activities 512, which together enable the creation, description, and deletion of network resources 108(1)-(N) in the context of a stack.

Figure 6:
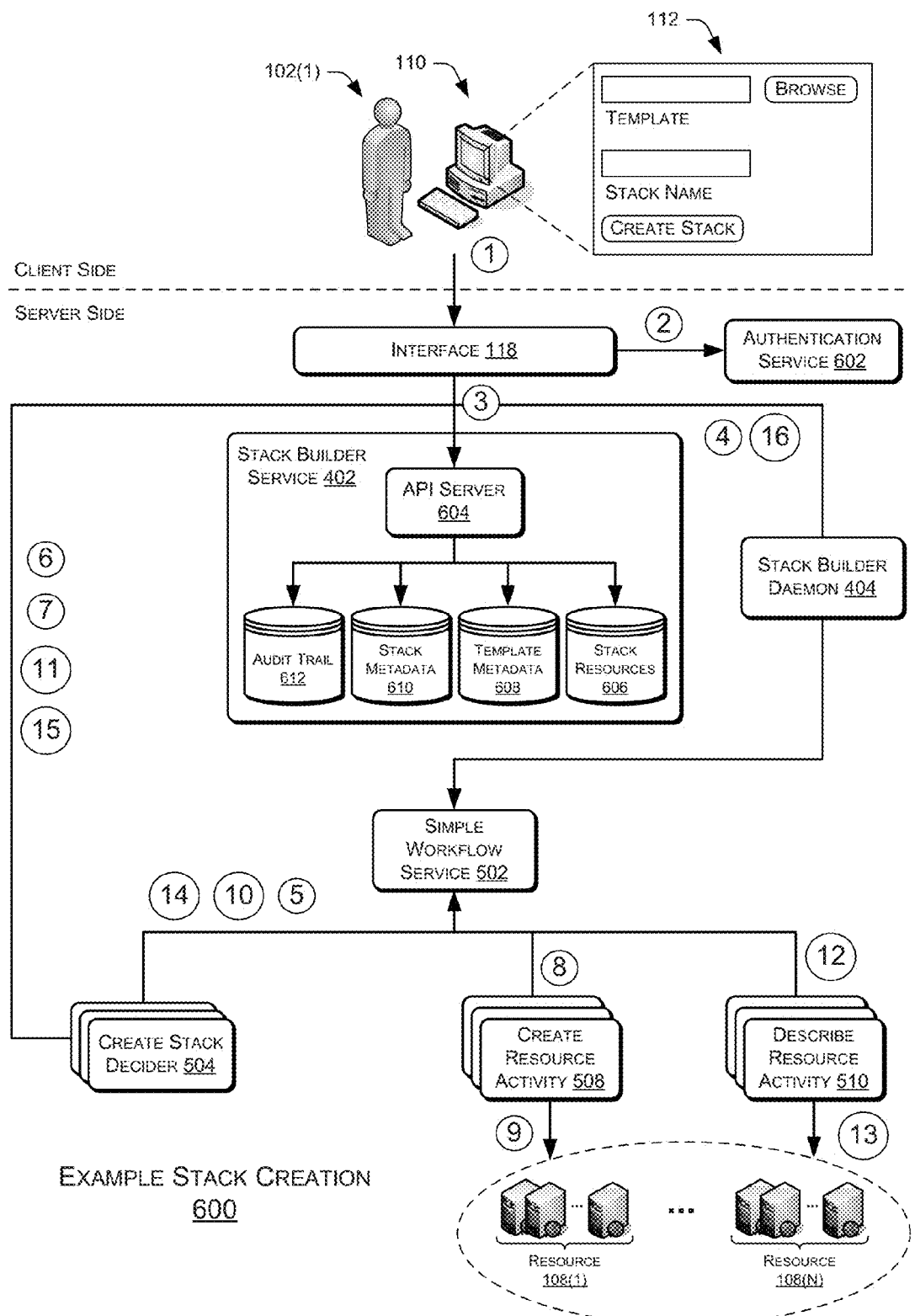
FIG. 6 illustrates an example process of creating a stack with use of a template within the architecture of FIGS. 1, 4, and 5.

FIG. 6 illustrates an example process 600 of creating a stack with use of a template within the architecture of FIGS. 1, 4, and 5. At "1," the example user 102(1) calls the CreateStack API, passing in the template name and stack name to the interface 118. At "2," an authentication service 602 authenticates the request.

At "3," the interface 118 delegates the request to the stack builder service 402 and, particularly, to an API server 604 of the stack builder service 402. The stack builder service 402 first validates the stack name to ensure that the chosen name is not a duplicate of another stack by referencing stack resources 606. The stack builder service 402 then verifies whether the template name is valid by referencing template metadata 608. If both the stack name and the template name are valid, the stack builder service 402 persists stack metadata (Namespace, StackName, TemplateName, Status=CREATE-PENDING) in a stack metadata (SDB) table 610 and a successful reply is sent back to the user 102(1).

At "4," The stack builder daemon 404 picks up stacks with Status=CREATE_PENDING and starts a CreateStack workflow, passing the Namespace, TemplateID, StackID to the created workflow. The daemon 404 then updates the status of those stacks to CREATE_IN_PROGRESS. The daemon 404 also enters an audit trail entry into an audit trail table 612 indicating that the stack creation is in progress.

At "5," create stack deciders 504 of the CreateStack workflow type periodically poll the SWF 502 for decision events. When one or more of the CreateStack deciders 504 receives the start workflow request from SWF 502, the respective decider 504 starts processing the create workflow request.

At "6," upon receiving the create stack request, the CreateStack decider 504 enters an entry into the audit trail table 612 regarding the stack creation.

At "7," the create stack decider 504 contacts the template service (e.g., template metadata 608) to obtain the internal representation of the template for the given template ID. Upon obtaining the template, the decider 504 computes the order in which to create the resources. This may be based on implicit dependencies from the template or text file or on explicit dependencies specified by the user 102(1). Once the decider 504 determines the order of resource creation, the decider 504 schedules the first set of CreateResource activities 508 corresponding to the network resources 108(1)-(N) in the computed list (along with configuration metadata captured in the template) to successfully create and configure one of the network resources 108(1)-(N).

At "8," the CreateResource activities 508 periodically poll the SWF 502 for work. At "9," upon receiving work to create and configure a specific resource from the SWF 502, the CreateResource activity 508 contacts the corresponding network resource to create and configure the resource. Once the create-resource call to the resource returns successfully, the CreateResource activity 508 indicates to the SWF 502, via the successful completion of the activity, that the resource has successful been created. The physical identifier of the resource that was successfully created by the activity may accompany the activity completion indication.

If, however, the CreateResource activity 508 receives an error/failure from the resource, the activity 508 reports a failure to the SWF 502 via the activity failed API. The error/failure message obtained from the resource by the activity 508 may accompany the activity-failed call to the SWF 502.

At "10," The CreateStack deciders 504 periodically poll the SWF 502 for work. At "11," if one of the CreateStack deciders 504 receives the information indicating that the create resource activity 508 completed successfully, then the CreateStack decider 504 updates the binding service with the information regarding the resource that was created. This includes the mapping of logical resource identifier to physical resource identifier and a creation timestamp. The decider 504 also enters an entry into the audit trail table 612 regarding the successful creation of the resource. The decider 504 then schedules a describe resource activity 510 to describe the status of the created resource.

If the decider 504 receives the information that the create resource activity timed out, then the decider 504 reschedules the create resource activity 508 for specified number of times with back off. Steps 8-11 may repeat until the activity 508 completes successfully or until the maximum number of retries is reached. If the maximum number of retries for the create resource activity is reached, the decider 504 enters a corresponding entry into the audit trail table 612 and initiates the closure of the workflow. If the decider 504 receives the information that the create resource activity 508 failed, the decider 504 examines the error code returned by the activity 508. Based on the error code, the decider 504 may handle the error in a fashion similar to an activity timeout and may retry the activity.

Conversely, based on the error code, the decider 504 may decide not to retry the activity and may instead update the binding service with the information regarding the failure in resource creation. This update may include logging the error messages received by the activity 508 while trying to create the resource, entering a corresponding entry into the audit trail table 612, and initiating the closure of the workflow.

When the decider 504 initiates the closure of the workflow, the following sequence of steps may be executed. First, the decider 504 annotates the workflow (using the state field of the workflow record) with the CREATE_FAILED tag. Once a workflow has been annotated with the CREATE_FAILED tag, no decider 504 will schedule any more activities for that workflow. Instead, once the previously scheduled create resource activities 508 for the workflow have been accounted for (e.g., either completed or failed), or a maximum number of retries has been reached, the decider 504 closes the workflow (via the CloseWorkflow SWF API) with an error message indicating that the stack could not be created successfully.

At "12," The DescribeResource activities 510 periodically poll the SWF 502 for work. At "13," upon receiving work to describe a specific network resource from the SWF 502, the DescribeResource activity 510 contacts the corresponding network resource to check the status of the resource. If the resource is in "active" state, the activity 510 completes successfully. Otherwise, the activity 510 reports the failure to the SWF 502.

At "14," The CreateStack decider 504 periodically polls the SWF 502 for work. If the CreateStack decider 504 receives the information indicating that the describe resource activity 510 completed successfully, the decider 504 enters a corresponding entry into the audit trail table 612 and once again contacts the template service (e.g., template metadata 608) to obtain the internal representation of the template. The decider 504 compares the resources described in the template to the resources that have been created (obtained from the workflow stack history) for the given stack and determines the resources that are yet to be created. If the set of resources to be created is empty, which indicates that the stack has been successfully created, the decider 504 closes the workflow. If, however, the resources are yet to be created, the decider 504 schedules the next batch of create source activities 508. The process 600 may repeat steps 8-14 until the entire stack is built.

At "15," if the decider 504 receives the information indicating that the describe resource activity 510 has timed out or failed, the decider 504 reschedules the create resource activity 510 for a specified number of times with back off. The process 600 may repeat steps 12-14 until the activity completes successfully or the maximum number of retries is reached. If the maximum number of retries for the create resource activity 508 is reached, the decider 504 enters a corresponding entry into the audit trail table 612 and initiates the closure of the workflow. The process by which the decider closes the workflow may be the same as the detailed earlier in step 10.

At "16," the stack builder daemon 404 periodically polls the SWF 502 to check if the workflow is complete for stacks with status=CREATE-IN-PROGRESS. Once the stack builder daemon 404 finds that the stack creation has been successfully completed, the stack builder daemon 404 marks the stacks status as CREATE-COMPLETE. However, if the stack builder daemon 404 observes that the stack creation has failed, via the CREATE-FIELD tag in the workflow status, the daemon 404 marks the stack status as CREATE-FAILED. Details of clean up of a failed stack creation are discussed below in the delete stack section. Once the stack creation workflow closes, the stack builder daemon 404 enters an entry into the audit trail table 612 regarding the success/failure of the stack creation.

Figure 7:
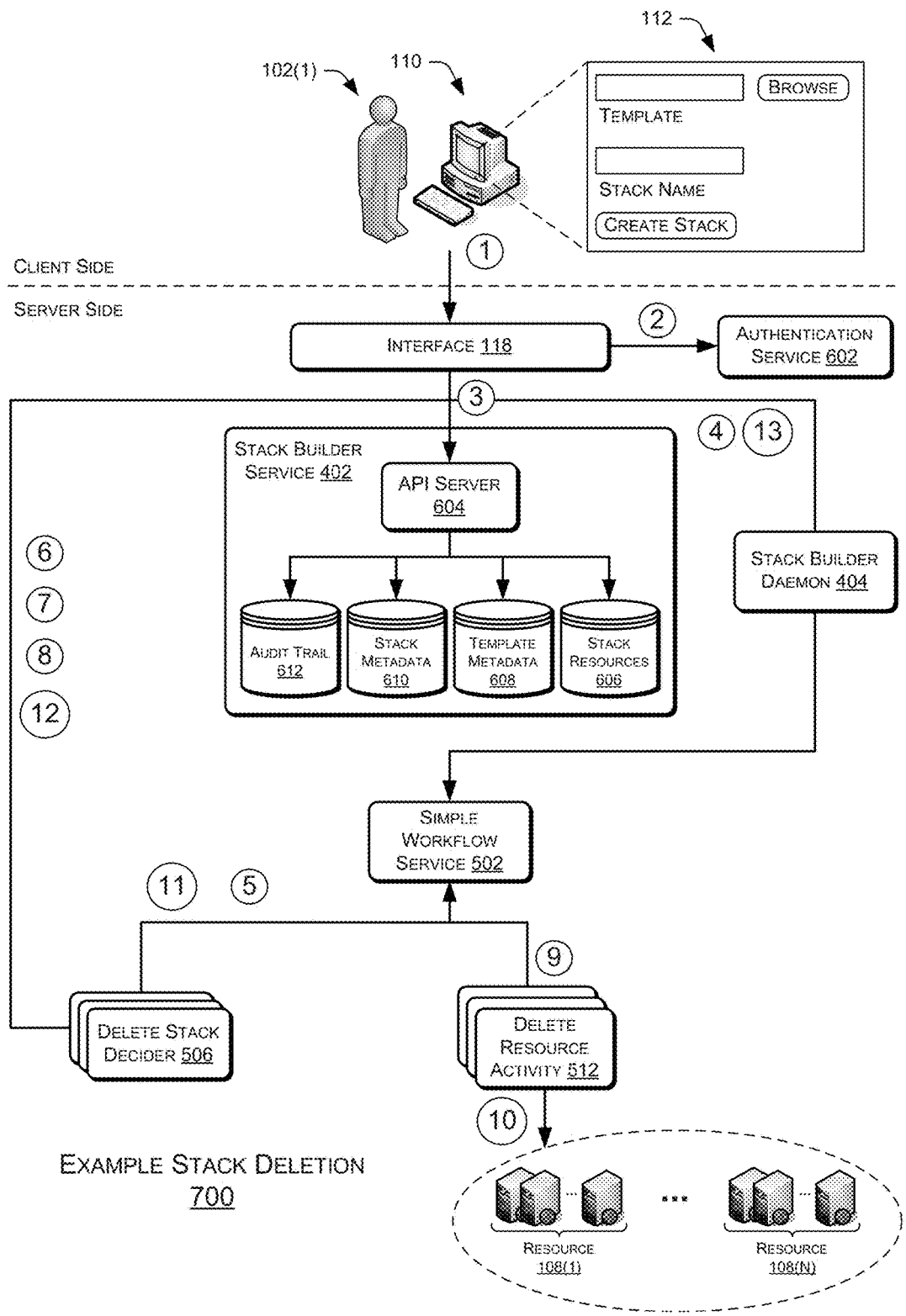
FIG. 7 illustrates an example process of deleting a stack within the architecture of FIGS. 1, 4, and 5.

FIG. 7 illustrates an example process 700 of deleting a stack within the architecture of FIGS. 1, 4, and 5. At "1," the example user 102(1) calls the DeleteStack API passing in a stack name to the interface 118. At "2," the authentication service 602 authenticates the request.

At "3," interface 118 delegates the request to the stack builder service 402 where the stack name is validated. The status of the corresponding stack is marked as DELETE_PENDING.

At "4," the Stack Builder daemon 404 looks for stacks in DELETE_PENDING status and starts a workflow of type DeleteStack by contacting the SWF 502. Inputs to the workflow include the StackID and the template ID used by the stack. The stacks status in the stack metadata 610 is now updated to DELETE_PROGRESS. The Stack Builder daemon 404 writes an entry into the audit trail table 612 indicating that the start deletion has started.

At "5," the deciders 506 of the DeleteStack workflow type periodically poll the SWF 502 for decision events. When one or more of the DeleteStack deciders 506 receives the start workflow request from the SWF 502, the decider 506 begins processing the delete stack request.

At "6," upon receiving the delete stack request, the decider 506 enters a corresponding entry into the audit trail table 612. At "7," the decider 506 contacts the template service (e.g., the template metadata 608) to obtain the template corresponding to the stack that is being deleted. Upon receiving the template, the decider 506 computes the order in which the resources are to be deleted. This may be done based on dependencies that are implicit in the stack and/or the template, and/or based on explicit dependencies that the user 102(1) provides.

At "8," based on the resource order computed in step 7, the decider 506 contacts the binding service to obtain the physical resource identifier and the resource type of the resources that are not in DELETED state. Upon obtaining the resource type and identifier, the decider 506 schedules the appropriate delete resource activity 512 to delete the resource that is part of the given stack. If the decider 506 is unable to find any resource that is not in DELETED state, the stack deletion is complete. The decider 506 then closes the workflow.

At "9," The DeleteResource activities 512 periodically poll the SWF 502 for work. At "10," upon receiving work to delete a network resource from the SWF 502, the DeleteResource activity 512 contacts the corresponding network resource to delete the resource. Input to the specific DeleteResource activity 512 includes the physical identifier of the resource to be deleted. Upon submitting a delete request to the resource, the DeleteResource activity 512 periodically polls the corresponding resource to check the status of the resource. Once the resource declares that the requested resource has been successfully deleted, the activity 512 indicates to the SWF 502, via the successful completion of the activity 512, that the deletion has successfully occurred. If the network returns a particular error type, the activity 512 reports a failure and accompanies the error message returned by the resource to the decider 506 along with the ActivityFailed API.

At "11," deciders of 506 of the DeleteStack workflow type periodically poll the SWF 502 for decision events. At "12," upon receiving the information regarding the activity completion, the binding service is updated to reflect the deletion of a resource within the stack. The decider 506 enters a corresponding entry into the audit trail table 612 regarding the successful resource deletion. The process 700 may repeat steps 7-12 until the entire stack is deleted. If the decider 506 receives information that the delete resource activity 512 has timed out or failed, the decider 506 reschedules the delete resource activity 506 a specified number of times. If the maximum number of retry attempts has been exceeded, the decider 506 updates the status and reason filed of the resources in the binding service to DELETE_FAILED and "max delete attempt reached." The decider 506 also enters a corresponding entry in the audit trail table 612 and annotates the workflow with the DELETE_FAILED tag using the status filed in the workflow metadata.

At "13," the stack builder daemon 404 periodically polls the SWF 502 to check if the workflow is closed for stacks with status=DELETE_PROGRESS. Once it finds that the stack deletion has been successfully completed, the stack builder daemon 404 marks the stacks status to DELETE_COMPLETE. If the daemon 404 discovers that the workflow has been annotated with the DELETE_FAILED tag, it updates the stack status to DELETE_FAILED.

In some instances, the example user 102(1) may initiate a deletion of a stack while the creation of a stack is in progress and before the stack is fully created. In this instance, the resource provisioning service 106 may interpret this as a request to terminate the stack creation. Under this scenario, the stack builder service 402 marks the stack status as CREATE_CANCEL_PENDING. The stack builder daemon 404 scans for stacks in CREATE_CANCEL_PENDING status and notes into the corresponding create stack workflow requesting the workflow to terminate. The stack builder daemon 404 then updates the stack status to CREATE_CANCEL_IN_PROGRESS.

Upon receiving the note event, the CreateStack decider 504 initiates closure of the workflow by waiting for outstanding activities to be accounted for. The procedure for closing the workflow may be the same as the procedure described above in the create stack scenario.

The stack builder daemon 404 periodically polls the SWF 502 to check if the create stack workflow is closed for stacks with status CREATE_CANCEL_IN_PROGRESS. Once the stack builder daemon 404 discovers that the stack creation has been terminated, the stack builder daemon 404 marks the stacks status to DELETE_PENDING. The process of stack deletion cleans up any resources that were created during stack creation.

Figure 8:
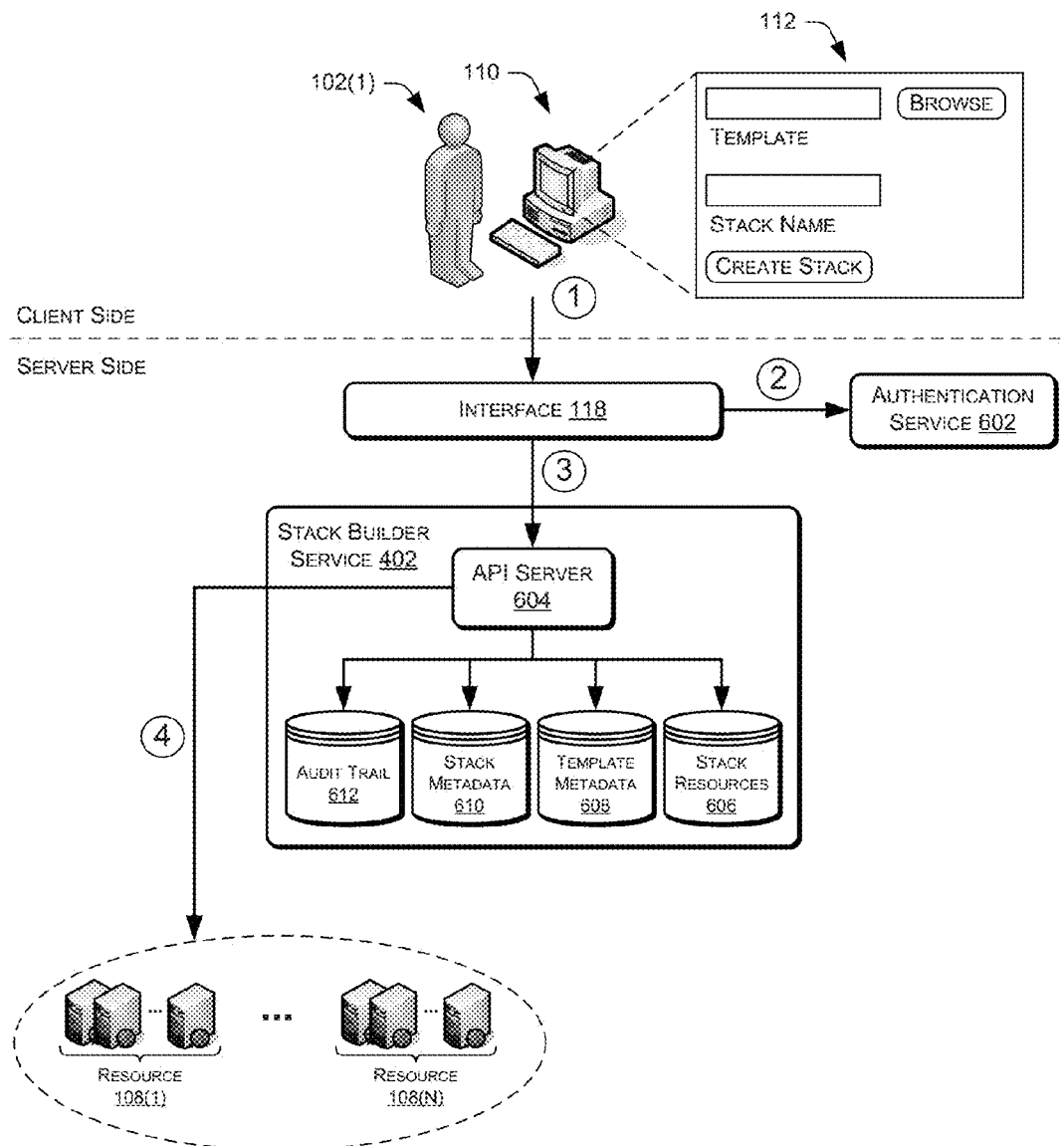
FIG. 8 illustrates an example process of adopting a stack within the architecture of FIGS. 1, 4, and 5.

FIG. 8 illustrates an example process of adopting a stack within the architecture of FIGS. 1, 4, and 5. At "1," the example user 102(1) calls the AdoptStack API, passing in the template name, stack name, and a map that captures the stack binding. At "2," The authentication service 602 authenticates the request.

At "3," the interface 118 delegates the request to the stack builder service 402 where the stack name is validated (e.g., checked for duplicates etc.). If the stack name is invalid, a fault is returned to the user. The Stack builder service 402 attempts to validate the template name, and if the template name is valid, the service 402 then validates the contents of the stack binding map to ensure that the template identified by the template name and the binding map are consistent with one another. If the template name is invalid, or the template identified by the name and the binding map are inconsistent, a fault is returned to the user.

At "4," the stack builder service 402 then invokes the DescribeResource API describing the resources listed in the template to verify that the resource listed in the binding map exists and is owned by the user 102(1). If any of the resources listed in the binding map do not exist, a fault is returned to the user. The stack builder service 402 creates a unique identifier for the stack and inserts a new entry into the binding service for the newly generated stack identifier with the binding information present in the binding map. The stack builder service 402 also inserts/updates the stack metadata table 610 to add/update the association between the user-provided stack name and the generated stack identifier. The stack builder service 402 also inserts an entry into the audit trail table 612 indicating the adoption of the stack.

Figure 9:
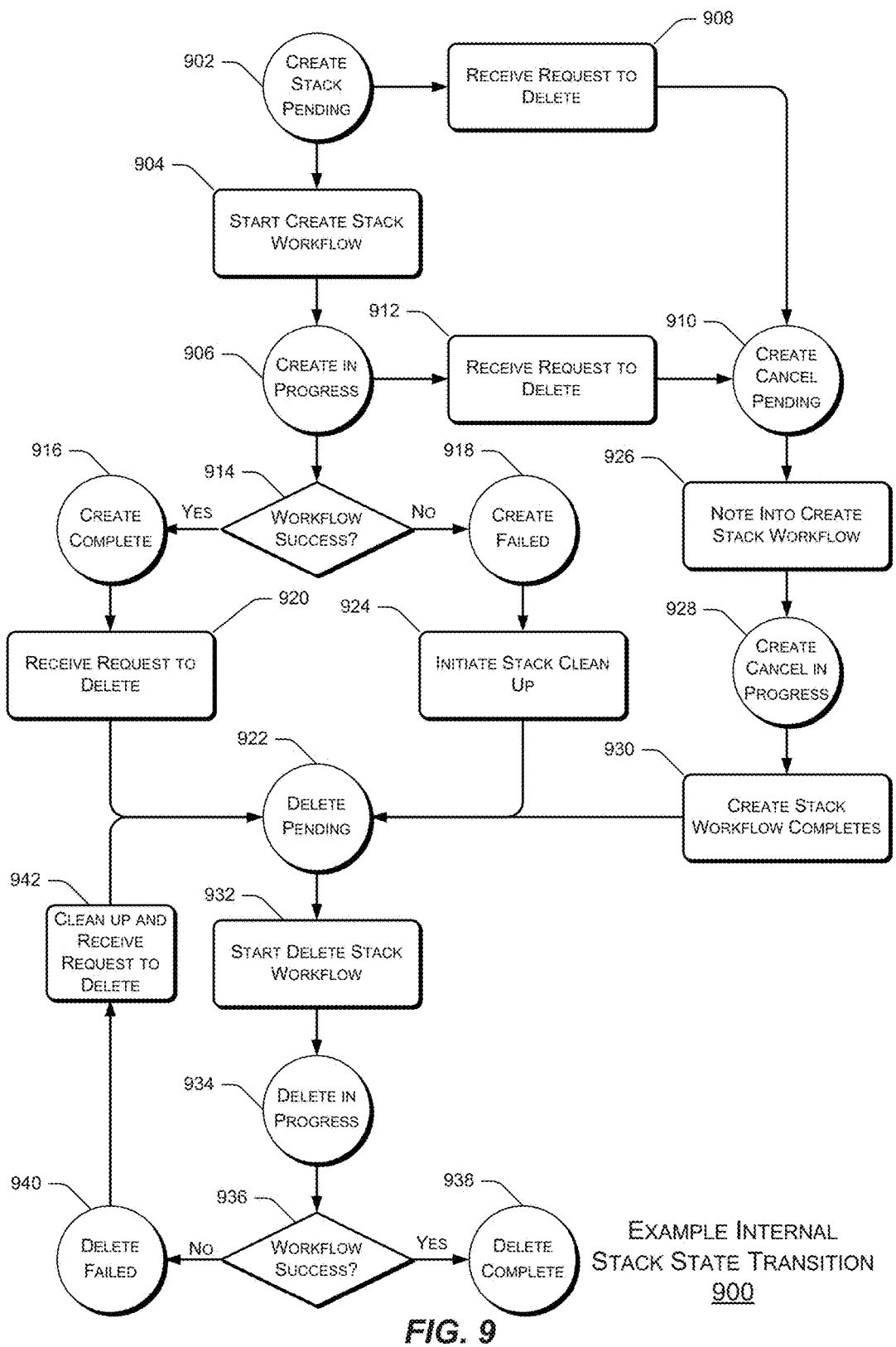
FIG. 9 illustrates an example transition of internal stack state during requests to create or delete a stack.

FIG. 9 illustrates an example transition of internal stack state during requests to create or delete a stack. In this example, the internal state of the example stack state is initially set to "Create Stack Pending," as shown at 902. At 904, the resource provisioning service 106 starts a create stack workflow. As shown at 906, this alters the internal stack state to "Create in Progress." If, however, the service 106 receives a request to delete the stack as shown at 908, the internal stack state becomes "Create Cancel Pending," as shown at 910.

The service 106 may also receive a request to delete the stack at 912 while the state is in "Create in Progress" (as shown at 906). In response, the internal stack state will also transition to "Create Cancel Pending," as shown at 910.

When a create stack workflow is in progress and no requests to delete the stack are received, the service 106 determines whether or not the create stack workflow is successful at 914. If so, then the internal stack state transition to "Create Complete" at 916. If not, then the internal stack state transitions to "Create Failed" at 918. In the former instances, the service 106 may receive a request to delete the stack at 920. In this instance, the internal stack state transitions to "Delete Pending," as shown at 922.

In instances where the internal stack state becomes "Create Failed," meanwhile, the transition 900 initiates a stack clean up at 924. Thereafter, the internal stack state transitions to "Delete Pending," as shown at 922.

Returning to the internal stack state of "Create Cancel Pending" at 910, the transition 900 notes into the create stack workflow at 926, as discussed above. The internal stack state then transitions to "Create Cancel in Progress" at 928. Thereafter, the create stack workflow completes at 930 and the stack state is updated to "Delete Pending," as shown at 922.

When the internal stack state is "Delete Pending," a delete stack workflow begins at 932. As shown at 934, the internal stack state then transitions to "Delete in Progress." At 936, the service 106 determines whether or not the delete stack workflow has successfully completed. If so, then the internal stack state transitions to "Delete Complete" at 938. If not, then the internal stack state transitions to "Delete Failed" at 940. Thereafter, the service 106 may clean up the workflow and may again receive a request to delete the stack at 942. In response, the internal stack state transitions to "Delete Pending" as shown at 922.

Figure 10:
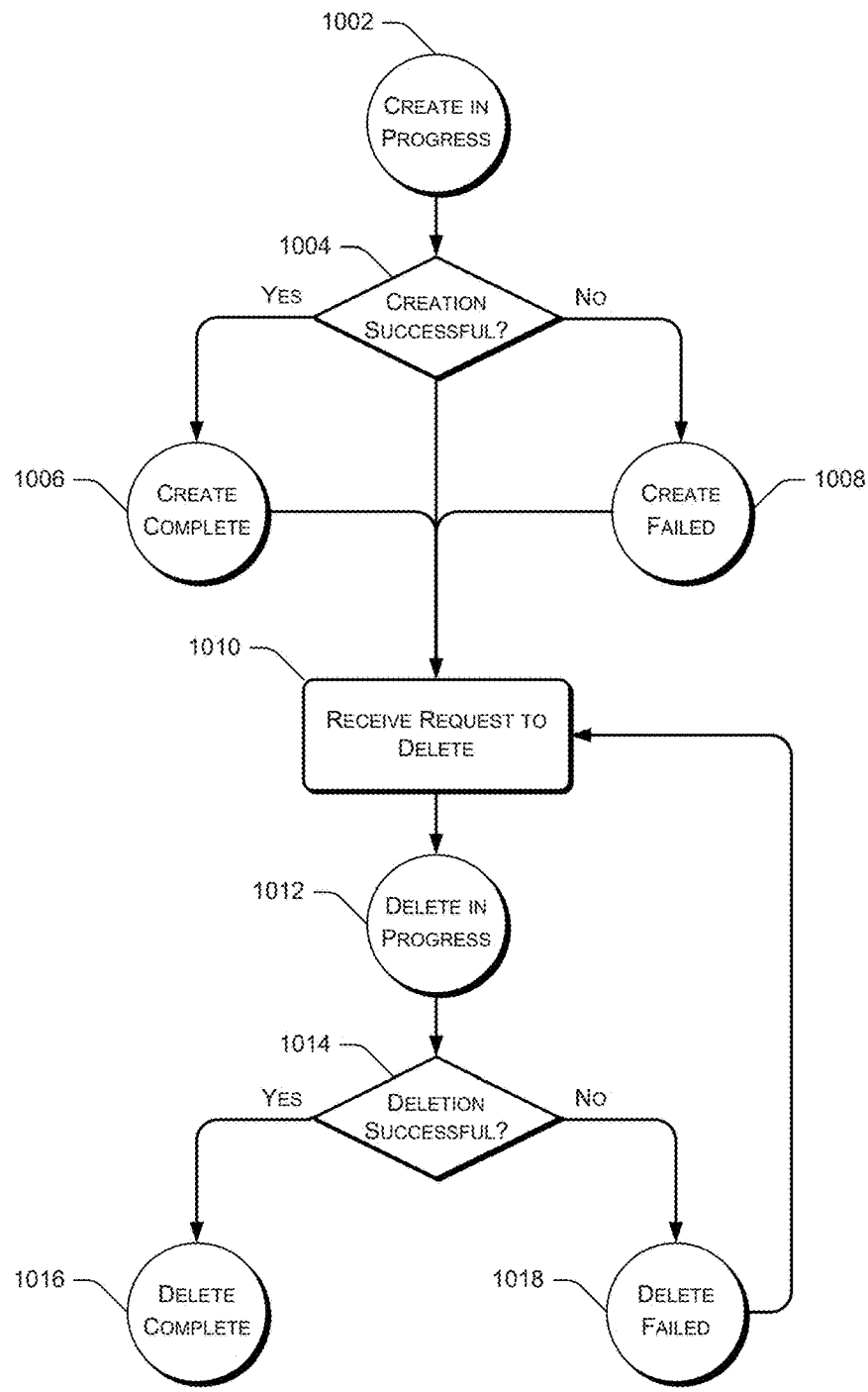
FIG. 10 illustrates an example transition of external stack state during requests to create or delete a stack.

FIG. 10 illustrates an example transition 1000 of external stack state during requests to create or delete a stack. In this example, the external state of the example stack state is initially set to "Create in Progress," as shown at 1002. At 1004, the resource provisioning service 106 determines whether or not the creation is successful. If so, then the external stack state transitions to "Create Complete" at 1006. If not, then the external stack state transitions to "Create Failed" at 1008.

At 1010, the service 106 receives a request to delete the stack. As such, the external stack state transitions to "Delete in Progress" at 1012. At 1014, the service 106 determines whether or not the deletion is successful. If so, then the external stack state becomes "Delete Complete" at 1016. If not, then the external stack state becomes "Delete Failed" at 1018. Thereafter, the service 106 may again receive a request to delete the stack, as shown at 1010.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
  receiving, from an external computing device, a request to provision a stack of network resources based at least in part on a template received from the external computing device, the template comprising:
    one or more parameters associated with each of the network resources; and
    instructions effective at least in part to provision the stack of network resources according to the one or more parameters;
  parsing the template to:
    identify each of the network resources requested for provisioning;
    identify each of the associated one or more parameters; and
    determine an order to provision each of the network resources based on respective dependencies of the network resources identified in the template; and
  executing a stack management workflow comprising attempting to provision each of the network resources according to the one or more parameters and the determined order.

2. The method of claim 1, further comprising:
  receiving the template from the external computing device; and
  storing the template to a database at least partly in response to receiving the template; and
  retrieving the template from the database in response to receiving the request.

3. The method of claim 1, wherein a particular parameter of the one or more parameters associated with a particular network resource of the network resources specifies a requested size, capability, characteristic, or any combination thereof, of the particular network resource.

4. The method of claim 1, wherein the order to provision each of the network resources is further based on explicit dependencies received from the external computing device.

5. The method of claim 1, wherein the template identifies at least one of the network resources by a logical name.

6. The method of claim 1, wherein the template specifies a particular version of multiple different versions for at least one of the network resources.

7. The method of claim 1, further comprising maintaining a user account associated with a user of the external computing device, and wherein the attempting to provision the network resources comprises attempting to provision the network resources such that a cost associated with a successful provisioning of a network resource is charged to the user account.

8. The method of claim 1, wherein the attempting to provision each of the network resources comprises attempting to provision at least two of the network resources in parallel.

9. An apparatus comprising:
  one or more processors;
  memory, accessible by the one or more processors, storing program instructions that when executed by the one or more processors cause the one or more processors to perform:
    receiving, from an external computing device, a request to provision a stack of network resources based at least in part on a template received from the external computing device, the template comprising:
      one or more parameters associated with each of the network resources; and
      template instructions effective at least in part to provision the stack of network resources according to the one or more parameters;
    parsing the template to:
      identify each of the network resources requested for provisioning;
      identify each of the associated one or more parameters; and
      determine an order to provision each of the network resources based on respective dependencies of the network resources identified in the template; and executing a stack management workflow comprising attempting to provision each of the network resources according to the one or more parameters and the determined order.

10. The apparatus of claim 9, wherein the network resources comprise a storage service, a load balancing service, a compute service, and a security service.

11. The apparatus of claim 9, wherein the network resources form at least a portion of a cloud-computing platform.

12. The apparatus of claim 9, wherein the template comprises a text file comprising text-based instructions that include calls to each of the network resources.

13. The apparatus of claim 9, wherein attempting to provision each of the network resources comprises is based at least in part on specified dependencies between a portion of the network resources.

14. The apparatus of claim 9, wherein the specified dependencies comprise implicit dependencies, and wherein the parsing of the template is effective to identify the implicit dependencies between the portion of the network resources.

15. The apparatus of claim 9, wherein the specified dependencies comprise explicit dependencies.

16. A non-transitory, computer-readable storage medium storing program instructions that when executed by one or more computing devices cause the one or more computing devices to implement:
receiving, from an external computing device, a request to provision a stack of network resources based at least in part on a template received from the external computing device, the template comprising:
one or more parameters associated with each of the network resources; and
template instructions effective at least in part to provision the stack of network resources according to the one or more parameters;
parsing the template to:
identify each of the network resources requested for provisioning;
identify each of the associated one or more parameters; and
determine an order to provision each of the network resources based on respective dependencies of the network resources identified in the template; and
executing a stack management workflow comprising attempting to provision each of the network resources according to the one or more parameters and the determined order.

17. The non-transitory, computer-readable storage medium of claim 16, wherein the program instructions cause the one or more computing devices to implement sending a notification to the external computing device that the stack has been provisioned at least partly in response to successfully provisioning each of the network resources.

18. The non-transitory, computer-readable storage medium of claim 16, wherein the program instructions cause the one or more computing devices to implement:
receiving an indication that provisioning of one of the network resources has failed;
ceasing the stack management workflow to stop provisioning additional ones of the network resources; and
executing a delete stack workflow comprising rolling back each successfully provisioned network resource of the network resources at least partly in response to the receiving of the indication.

19. The non-transitory, computer-readable storage medium of claim 18, wherein the program instructions cause the one or more computing devices to implement sending a notification to the external computing device that provisioning of the stack has failed at least partly in response to the indication.

20. The non-transitory, computer-readable storage medium of claim 16, wherein the stack management workflow comprises a create stack workflow, wherein the create stack workflow attempts to provision each of the network resources.

* * * * *